United States Patent
McLaren et al.

(10) Patent No.: US 8,660,390 B2
(45) Date of Patent: Feb. 25, 2014

(54) REDUNDANT RING RESONATORS OF VARYING DIMENSIONS TO REDUCE RING RESONATOR TUNING REQUIREMENTS

(75) Inventors: Moray McLaren, Bristol (GB); Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 384 days.

(21) Appl. No.: 13/146,473

(22) PCT Filed: Jan. 27, 2009

(86) PCT No.: PCT/US2009/000529
§ 371 (c)(1),
(2), (4) Date: Jul. 27, 2011

(87) PCT Pub. No.: WO2010/087790
PCT Pub. Date: Aug. 5, 2010

(65) Prior Publication Data
US 2012/0057866 A1    Mar. 8, 2012

(51) Int. Cl.
*G02B 6/26*    (2006.01)

(52) U.S. Cl.
USPC ............................................. 385/30; 385/50

(58) Field of Classification Search
None
See application file for complete search history.

(56) References Cited

U.S. PATENT DOCUMENTS

| | | | |
|---|---|---|---|
| 6,970,619 B2 | 11/2005 | Baumann et al. | |
| 7,058,258 B2 | 6/2006 | Rice | |
| 7,245,801 B2 | 7/2007 | Boyd et al. | |
| 8,519,803 B2 * | 8/2013 | McLaren et al. | 333/17.1 |

\* cited by examiner

*Primary Examiner* — Sarah Hahm

(57) ABSTRACT

Various embodiments of the present invention relate to systems for reducing the amount of power consumed in temperature tuning resonator-based transmitters and receivers. In one aspect, a system comprises an array of resonators (801-806) disposed adjacent to a waveguide (646) and a heating element (808). The heating element is operated to thermally tune the array of resonators so that each resonator in a subset of the array of resonators is in resonance with a wavelength of light traveling in the waveguide.

15 Claims, 12 Drawing Sheets

US 8,660,390 B2

REDUNDANT RING RESONATORS OF VARYING DIMENSIONS TO REDUCE RING RESONATOR TUNING REQUIREMENTS

TECHNICAL FIELD

Embodiments of the present invention relate generally to ring resonators, and in particular, to transmitters and receivers that are configured with redundant ring resonators in order to reduce tuning requirements.

BACKGROUND

In recent years, ring resonators ("resonators") have increasingly been employed as an essential component in optical networks and other nanophotonic systems that are integrated with electronic devices. A resonator can ideally be configured with a resonance wavelength substantially matching a particular wavelength of light. When the resonator is positioned adjacent to a waveguide within the evanescent field of light propagating along the waveguide, the resonator evanescently couples the particular wavelength of light from the waveguide and traps the light for a period of time. Resonators are well-suited for use in modulators and detectors in nanophotonic systems employing wavelength division multiplexing ("WDM"). These systems transmit and receive data encoded in different wavelengths of light that can be simultaneously carried by a single optical fiber or waveguide. Resonators can be positioned at appropriate points along the optical fiber or waveguide and operated to encode information by modulating unmodulated wavelengths of light and detect wavelengths of light encoding information and translate the encoded wavelengths into electrical signals for processing.

A resonator's dimensions directly affect the resonator's resonance wavelength, which is particularly important because in typical WDM systems the wavelengths may be separated by fractions of a nanometer. However, even with today's microscale fabrication technology, fabricating resonators with the dimensional precision needed to insure that the resonator's resonance wavelength matches a particular wavelength of light can be difficult. This problem arises because the resonance wavelength of a resonator is inversely related to the resonator's size. In other words, the resonance wavelength of a small resonator is more sensitive to variations in resonator size than that of a relatively larger resonator. For example, a deviation of just 10 nm in the radius of a nominally 10 μm radius resonator results in a resonance wavelength deviation of 1.55 nm from the nominal resonance wavelength for which the ring resonator was designed. This 0.1% deviation approaches the limits in accuracy for fabricating resonators using optical lithography. A deviation of this magnitude is undesirable and in fact may be unacceptable in typical optical networks and microscale optical devices where the wavelength spacing may be less than 1 nm.

In addition to inaccuracies encountered during fabrication of resonators, environmental conditions under which the resonators are operated can change the resonance wavelength of the resonators. In particular, a temperature change in the resonator shifts the effective refractive index of the resonator resulting in deviations from a desired resonance wavelength. This is problematic in integrated CMOS-nanophotonic systems where the power dissipation and temperature of adjacent circuitry varies substantially over time.

Thus, it is desirable to tune transmitting and receiving resonators in order to compensate for resonance wavelength deviations that may be due to environmental conditions and fabrication inaccuracies.

DETAILED DESCRIPTION

Various embodiments of the present invention relate to resonator-based systems that can be incorporated in optical transmitters and receivers to reduce the amount of power consumed to thermally tune the transmitters and receivers. The resonator-based systems include a number of redundant resonators enabling the resonators to be thermally tuned so that each resonator in a subset of resonators is in resonance with a wavelength of light traveling in an adjacent waveguide. A heating element is also included to distribute heat evenly to the resonators during thermal tuning enabling localized resonator temperature control.

I. Microring Resonators

Figure 1:
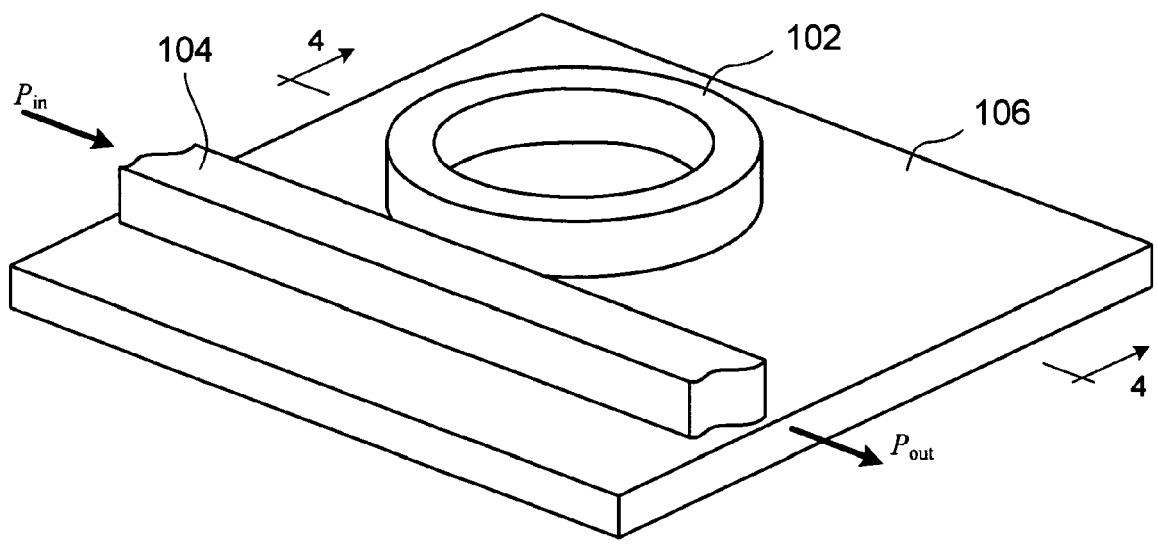
FIG. 1 shows an isometric view and enlargement of a microring resonator and a portion of an adjacent ridge waveguide configured in accordance with embodiments of the present invention.

FIG. 1 shows an isometric view and enlargement of a microring resonator 102 and a portion of an adjacent ridge waveguide 104 disposed on the surface of a substrate 106 in accordance with embodiments of the present invention. The resonator 102 and the waveguide 104 are composed of a material having a relatively higher refractive index than the substrate 106. For example, the resonator 102 can be composed of silicon ("Si") and the substrate 106 can be composed of $SiO_2$ or a lower refractive index material. Light of a particular wavelength transmitted along the waveguide 104 is evanescently coupled from the waveguide 104 into the resonator 102 when the wavelength of the light and the dimensions of the resonator 102 satisfy the resonance condition:

$$\frac{L}{m} = \frac{\lambda}{n_{eff}(\lambda, T)}$$

where $n_{eff}$ is the effective refractive index of the resonator 102, L is the effective optical path length of the resonator 102, m is an integer indicating the order of the resonance, and $\lambda$ is the free-space wavelength of the light traveling in the waveguide 104. The resonance condition can also be rewritten as $\lambda = Ln_{eff}(\lambda,T)/m$. In other words, the resonance wavelength for a resonator is a function of the resonator effective refractive index and optical path length.

Evanescent coupling is the process by which evanescent waves of light are transmitted from one medium, such as resonator, to another medium, such a ridge waveguide, and vice versa. For example, evanescent coupling between the resonator 102 and the waveguide 104 occurs when the evanescent field generated by light propagating in the waveguide 104 couples into the resonator 102. Assuming the resonator 102 is configured to support the modes of the evanescent field, the evanescent field gives rise to light that propagates in the resonator 102, thereby evanescently coupling the light from the waveguide 104 into the resonator 102.

Figure 2:
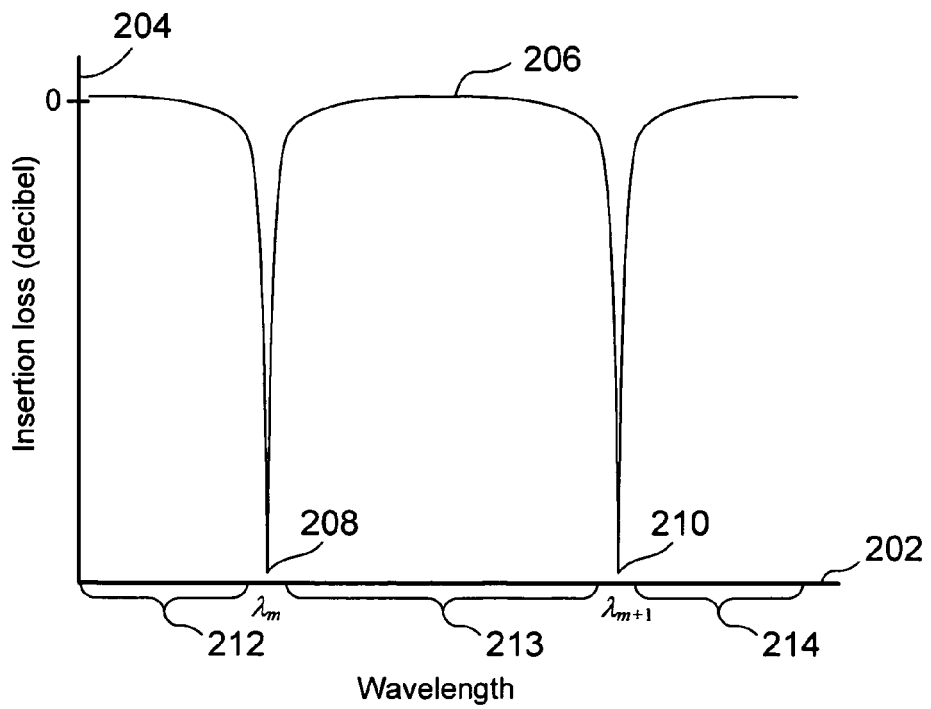
FIG. 2 shows a plot of insertion loss versus wavelength for a microring resonator and adjacent waveguide in accordance with embodiments of the present invention.

FIG. 2 shows a plot of insertion loss versus wavelength for the resonator 102 and the waveguide 104 shown in FIG. 1. Insertion loss, also called attenuation, is the loss of optical power associated with a wavelength of light traveling in the waveguide 104 coupling into the resonator 102 and can be expressed as $10 \log_{10}(P_{in}/P_{out})$ in decibels ("dB"), where $P_{in}$ represents the optical power of light traveling in the waveguide 104 prior to reaching the resonator 102, and $P_{out}$ is the optical power of light that passes the resonator 102. In FIG. 2, horizontal axis 202 represents wavelength, vertical axis 204 represents insertion loss, and curve 206 represents the insertion loss of light passing the resonator 102 over a range of wavelengths. Minima 208 and 210 of the insertion loss curve 206 correspond to wavelengths $\lambda_m = Ln_{eff}/m$ and $\lambda_{m+1} = Ln_{eff}/(m+1)$. These wavelengths represent only two of many regularly spaced minima. Wavelengths of light satisfying the resonance condition above are said to have "resonance" with the resonator 102 and are evanescently coupled from the waveguide 104 into the resonator 102. In the narrow wavelength regions surrounding the wavelengths $\lambda_m$ and $\lambda_{m+1}$, the insertion loss curve 206 reveals a decrease in the insertion loss the farther wavelengths are away from the wavelengths $\lambda_m$ and $\lambda_{m+1}$. In other words, the strength of the resonance between the resonator 102 and light traveling in the waveguide 104 decreases the farther the wavelengths are away from $\lambda_m$ and $\lambda_{m+1}$, and thus, the amount of the light coupled from the waveguide 104 into the resonator 102 decreases the farther the wavelengths are away from $\lambda_m$ and $\lambda_{m+1}$. Light with wavelengths in the regions 212-214 pass the resonator 102 substantially undisturbed.

According to the resonance condition, because the resonance wavelength $\lambda$ is a function of the optical path length L and the effective refractive index $n_{eff}$, changing the effective refractive index and/or the optical path length produces a corresponding change in the resonance wavelength of the resonator. The resonator's effective refractive index and the optical path length L can be changed by varying the resonator's temperature (i.e., thermal tuning). For thermal tuning, the resonance wavelength shift can be expressed as:

$$\Delta\lambda = \lambda \frac{\Delta n_{eff} \Delta L}{n_{eff} L}$$

where $\Delta n_{eff}$ is the change in the effective refractive index of the material comprising the resonator, and $\Delta L$ is the change in the optical path length of the resonator.

In addition, resonators can be composed of semiconductor materials that exhibit electro-optic behavior. The effective refractive index of an electro-optic material is changed when an electric field is applied or charge carriers are injected. Thus, the resonance wavelength of a resonator can be electronically tuned by injecting current into the resonator (i.e., current tuning) or by applying a voltage to the resonator (i.e., electro-optic tuning). For electronic tuning, the resonance wavelength shift can be expressed as:

$$\Delta\lambda = \lambda \frac{\Delta n_{eff}}{n_{eff}}$$

Figure 3:
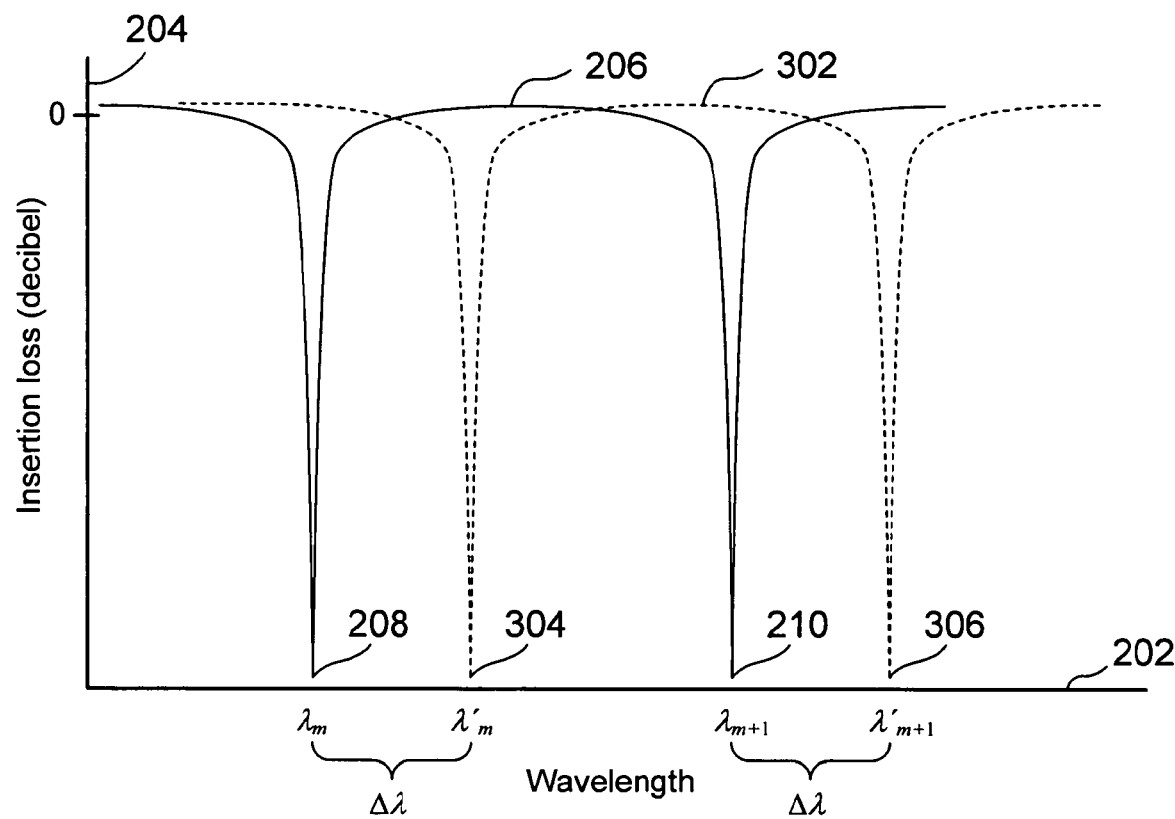
FIG. 3 shows a plot of insertion loss versus wavelength for a microring resonator and adjacent waveguide where the effective refractive index and the optical path length of the microring resonator are changed in accordance with embodiments of the present invention.

FIG. 3 shows a plot of insertion loss versus wavelength represented by dashed-line curve 302 for the resonator 102 and the waveguide 104, where the effective refractive index $n_{eff}$ and/or the optical path length L are changed as a result of temperature tuning or electronic tuning. Shifting the resonance wavelength of the resonator 102 by $\Delta\lambda$ shifts the insertion loss minima 208 and 210 associated with the wavelengths $\lambda_m$ and $\lambda_{m+1}$ to insertion loss minima 304 and 306 associated with the wavelengths $\lambda'_m$ and $\lambda'_{m+1}$. Comparing curve 302 with curve 206 reveals that light with the wavelengths $\lambda'_m$ and $\lambda_{m+1}$ is no longer evanescently coupled from the waveguide 104 into the resonator 102, but light with wavelengths $\lambda'_m$ and $\lambda'_{m+1}$ is evanescently coupled from the waveguide 104 into the resonator 102.

Figure 4:
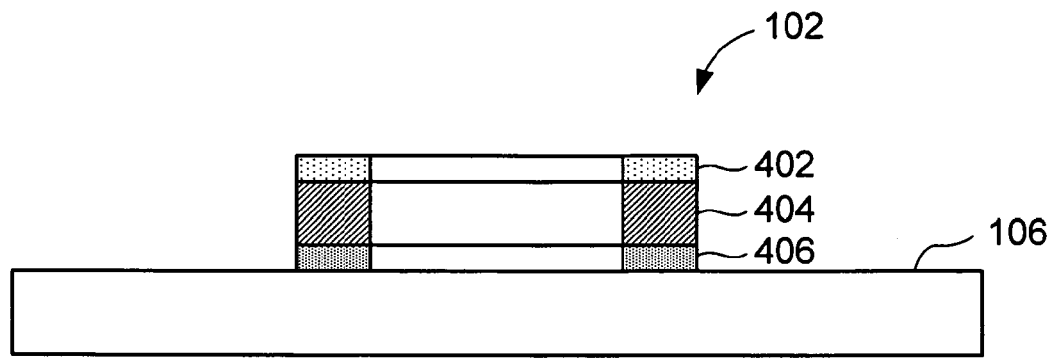
FIG. 4 shows a cross-sectional view of a first microring resonator configured for electronic tuning in accordance with embodiments of the present invention.

FIG. 4 shows a cross-sectional view of the resonator 102, along a line 4-4 shown in FIG. 1, configured for electronic tuning in accordance with embodiments of the present invention. In FIG. 4, resonator 102 can be composed of a wide variety of different semiconductor materials. For example, the resonator 102 can be composed of an elemental semiconductor, such as Si and germanium (Ge), or a III-V compound semiconductor, where Roman numerals III and V represent elements in the Ma and Va columns of the Periodic Table of the Elements. Compound semiconductors can be composed of column IIIa elements, such as aluminum (Al), gallium (Ga), and indium (In), in combination with column Va elements, such as nitrogen (N), phosphorus (P), arsenic (As), and antimony (Sb). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

The structure of resonator 102 for electronic tuning involves doping the upper cladding 402 with a p-type impurity, the core 404 of the resonator 102 can be intrinsic or lightly doped, and the lower cladding 406 can be doped with an n-type impurity. The layers 402, 404, and 406 form a p-i-n junction. P-type impurities can be atoms that introduce vacant electronic energy levels called "holes" to the electronic band gaps of the core 404. These impurities are also called "electron acceptors." N-type impurities can be atoms that introduce filled electronic energy levels to the electronic band gap of the core 404. These impurities are called "electron donors." For example, boron (B), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities. Moderate doping of the core 404 can have impurity concentrations in excess of about $10^{15}$ impurities/cm$^3$ while more heavy doping of the core 404 can have impurity concentrations in excess of about $10^{19}$ impurities/cm$^3$.

Figure 5A:
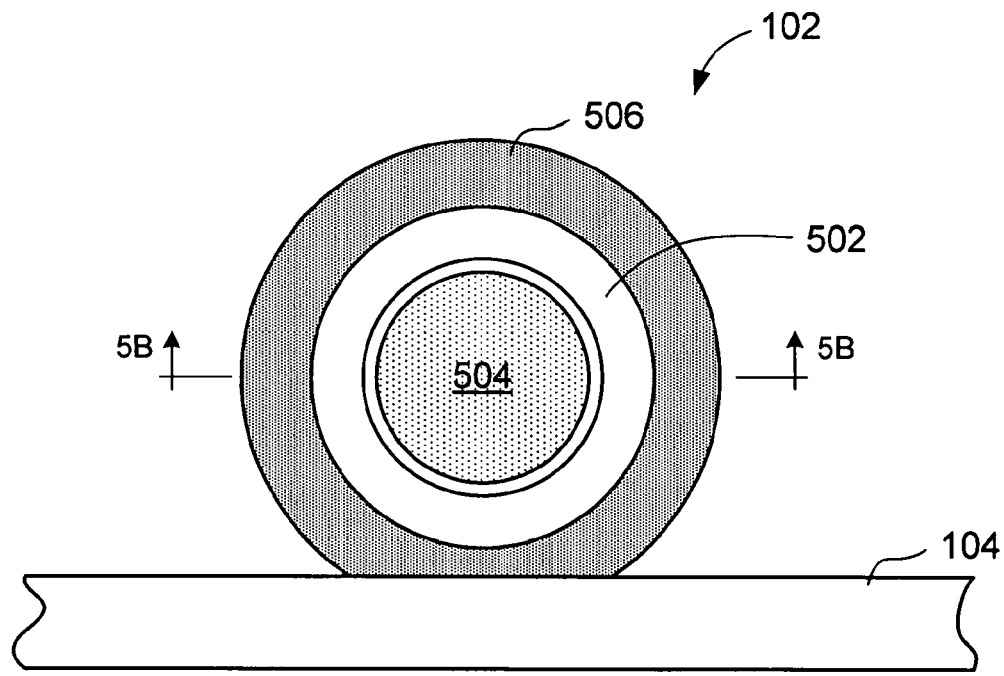
FIG. 5A shows a schematic representation and top view of a second microring resonator configured for electronic tuning in accordance with embodiments of the present invention.
Figure 5B:
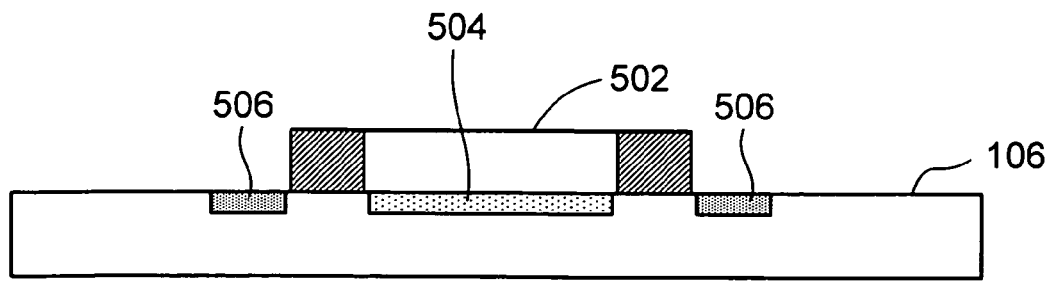
FIG. 5B shows a cross-sectional view of the microring resonator along a line 5B-5B, shown in FIG. 5A, in accordance with embodiments of the present invention.

In other embodiments, the resonator 102 can be electronically tuned by doping regions of the substrate 106 surrounding the resonator 102 and waveguide 104 with appropriate electron donor and electron acceptor impurities. FIG. 5A shows a schematic representation and top view of doped regions surrounding the resonator 102 and the waveguide 104 in accordance with embodiments of the present invention. FIG. 5B shows a cross-sectional view of the doped regions surrounding the resonator 102 along a ling 5B-5B, shown in FIG. 5A, in accordance with embodiments of the present invention. In certain embodiments, the resonator 102 comprises an intrinsic semiconductor ring 502, an n-type region 504 can be formed in the semiconductor substrate interior of the ring 502, and a p-type region 506 can be formed in the substrate 106 surrounding the outside of the ring 502. The ring 502, the p-type region 504, and the n-type region 506 also form a p-i-n junction.

In other embodiments, the p-type and n-type impurities of the resonators 102 shown in FIGS. 4 and 5 can be reversed.

When electrical contact is made to the p-type layer 402 and the n-type layer 406 or the p-type region 501 and the n-type region 502, the resulting p-i-n junction may then be operated in forward- or reverse-bias mode. Under a forward bias, a change in the index of refraction of the core 402 or the ring 502 may be induced through current injection. Under reverse bias, a high electrical field can be formed across the intrinsic core 402 or ring 502 and a refractive index change can result through the electro-optic effect. Both of these electronic tuning techniques provide only a relatively small shift in the effective refractive index of the resonator 102.

Electronic tuning provides relatively higher speed changes in the effective refractive index of the resonator 102 than thermal tuning. For example, electronic tuning can be accomplished in the microsecond and nanosecond time ranges, while thermal tuning can take place in the sub-millisecond or even millisecond time range. Thus, electronic tuning is suitable for encoding information in unmodulated light. However, electronic tuning can only tune a resonator over a relatively limited range of wavelengths, on the order of several nanometers. However, in order to adjust for inaccuracies in the fabrication of resonators or temperature changes tuning over a wavelength range of at least 10-20 nm is desirable. Thus, electronic tuning cannot be effectively used. On the other hand, thermal tuning offers the possibility of a greater resonance wavelength tuning range than electronic tuning, although at somewhat slower speeds.

II. Ring Resonator-Based Transmitters and Receivers

Figure 6:
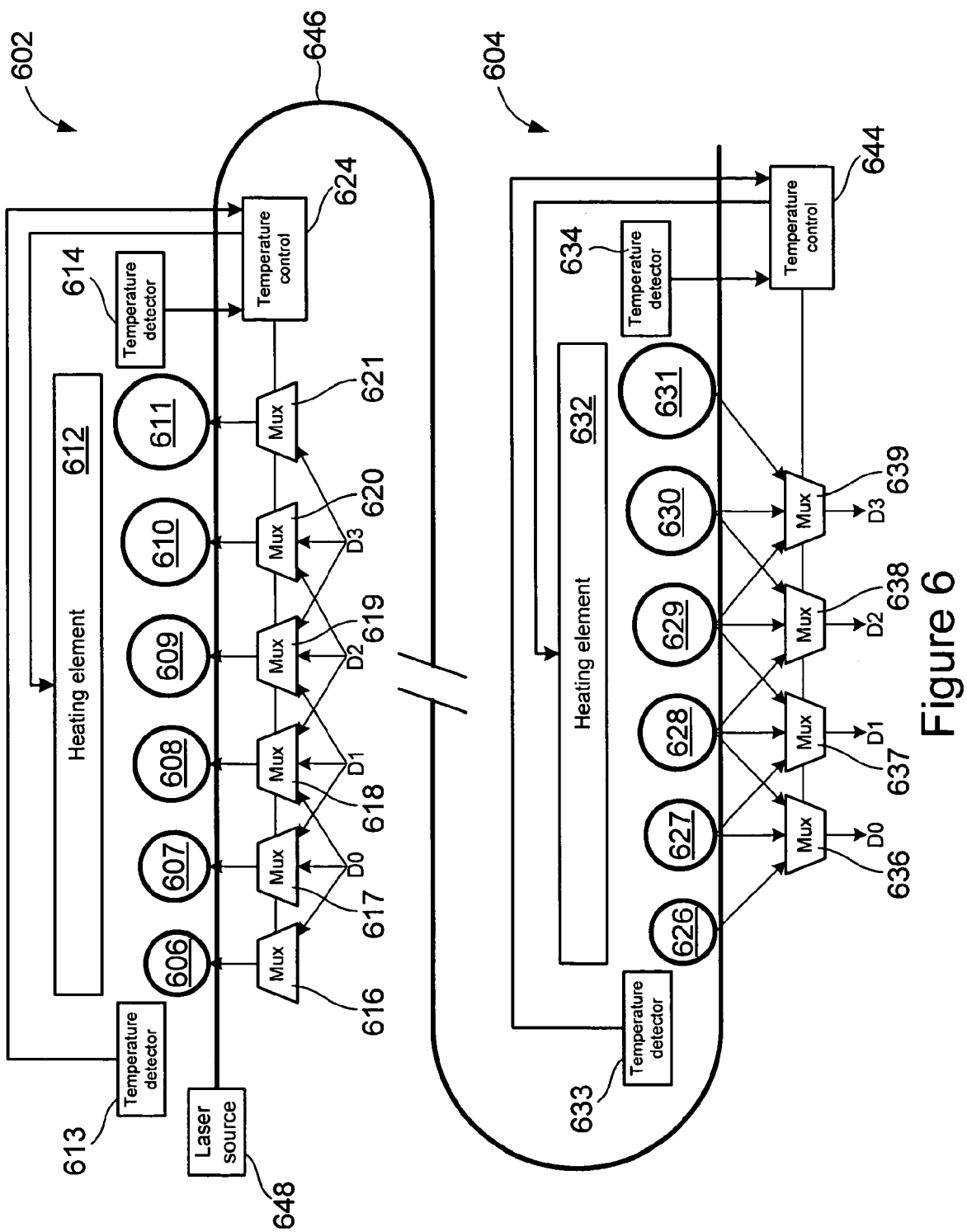
FIG. 6 shows a schematic representation of a ring resonator-based transmitter and a ring resonator-based receiver configured in accordance with embodiments of the present invention.

FIG. 6 shows a schematic representation of a ring resonator-based transmitter 602 and a ring resonator-based receiver 604 configured in accordance with embodiments of the present invention. The transmitter 602 comprises an array of six microring resonators 606-611, a heating element 612, temperature detectors 613 and 614, six multiplexers 616-621, and an electronic temperature control 622. Each of the six multiplexers 616-621 is in electronic communication with one of the resonators, and all six of the multiplexers 616-621 are in electronic communication with the temperature control 622. For example, multiplexer 616 is in electronic communication with resonator 606, multiplexer 617 is in electronic communication with resonator 607 and so on. The heating element 612 and temperature detectors 613 and 614 are also in electronic communication with the temperature control 624. The receiver 604 also comprises an array of six microring resonators 626-631, a heating element 632, temperature detectors 633 and 634, four multiplexers 636-639, and an electronic temperature control 644. Each of the four multiplexers 636-641 is in electronic communication with three of the resonators, and all four multiplexers 636-641 are in electronic communication with the temperature control 644. In particular, multiplexer 636 is in electronic communication with resonators 626-628, multiplexer 639 is in electronic communication with resonators 627-629, multiplexer 640 is in electronic communication with resonators 628-630, and multiplexer 641 is in electronic communication with resonators 629-631.

The heating elements 612 and 632 are electronically resistive layers with the heating element 612 electronically coupled to a variable current source located within the temperature control 624, and the heating element 612 is also electronically coupled to a variable current source located within the temperature control 624. The configuration, positions, and materials comprising the heating elements 612 and 632 are selected so that heating elements 612 and 632 deliver about the same amount of heat to each of the resonators. The heating elements are composed of materials that through the process of Joule heating convert electrical current supplied by the variable current control into heat. For example, the heating elements 612 and 632 can be composed of platinum, nichrome, silicon carbide, molybdenum disilicide, or other suitable metals and alloys that through resistance convert electrical current into heat. As shown in FIG. 6, the lengths of the heating elements 608 and 628 approximately span the overall length of the resonators distributed along a waveguide 646. The heating elements 612 and 632 can be located in various positions in order to provide even heating of the arrays of resonators.

Figure 7A:
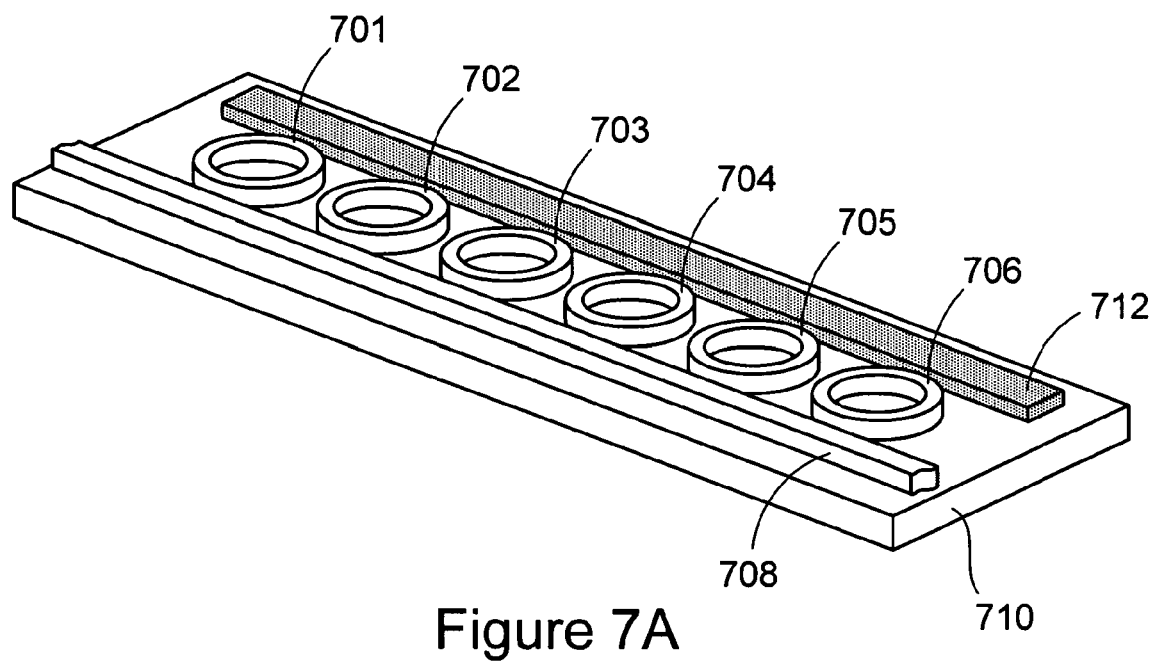
FIGS. 7A-7E show isometric and cross-sectional views of an array of resonators, a waveguide, and various locations of a heating element in accordance with embodiments of the present invention.
Figure 7B:
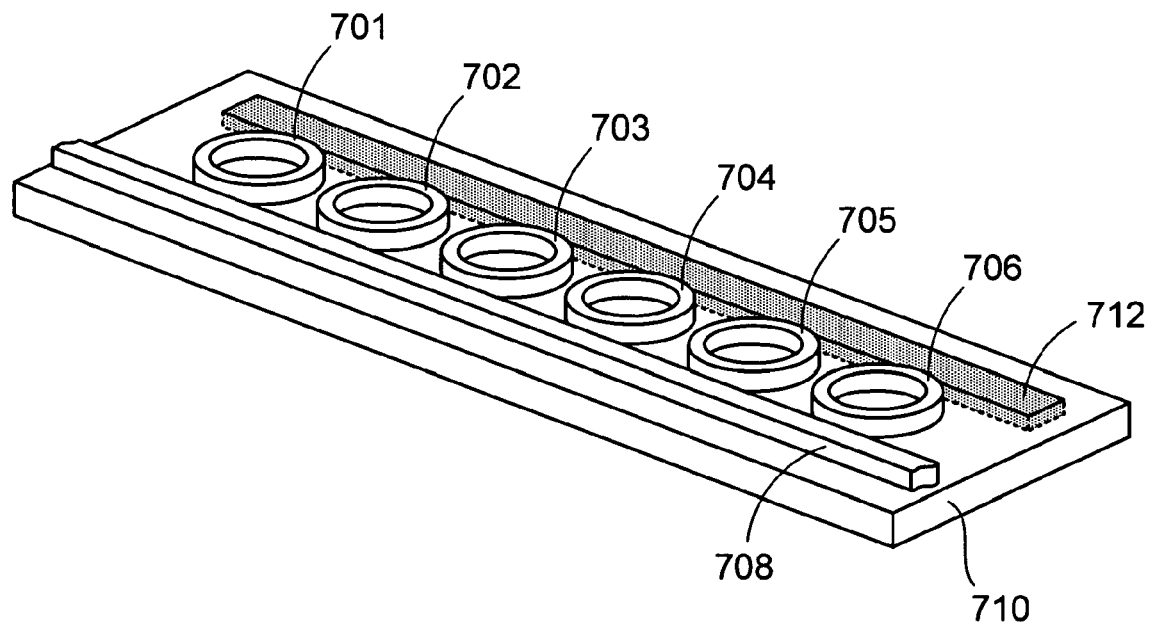
Figure 7C:
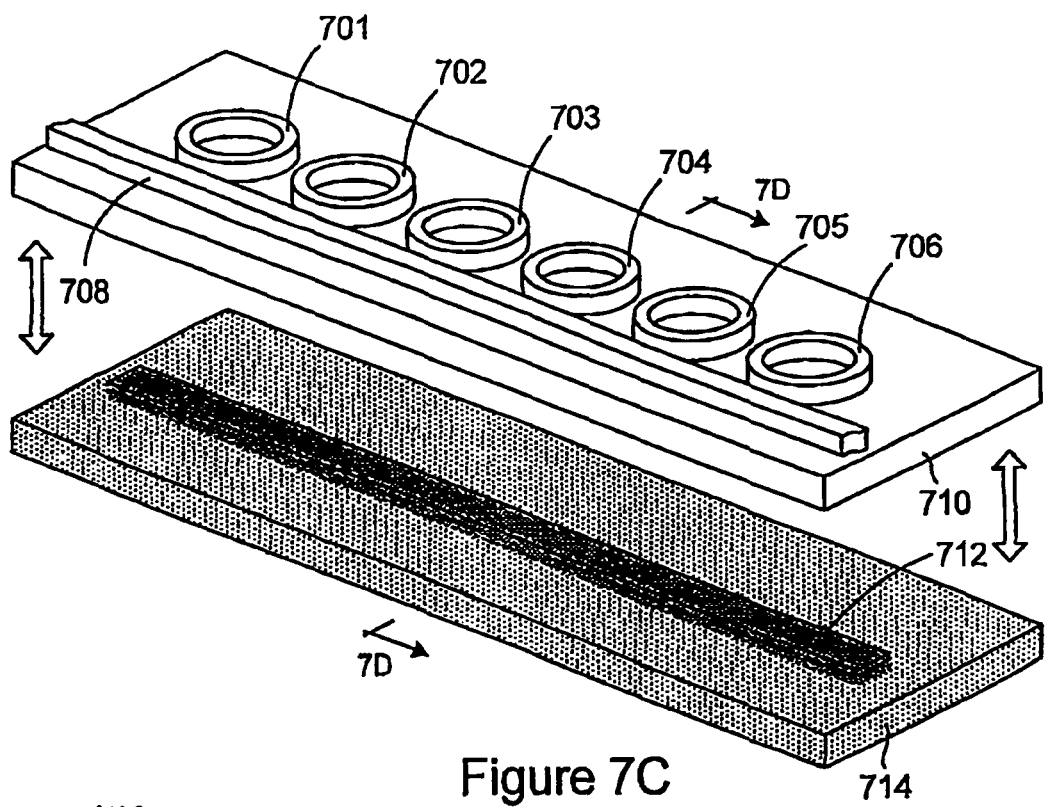
Figure 7D:
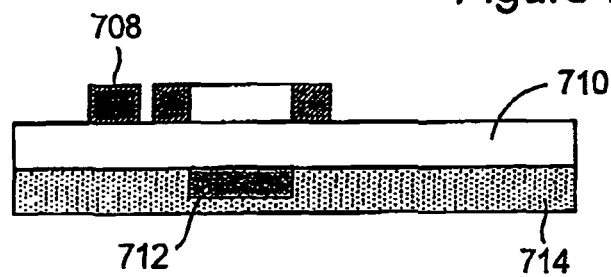
Figure 7E:
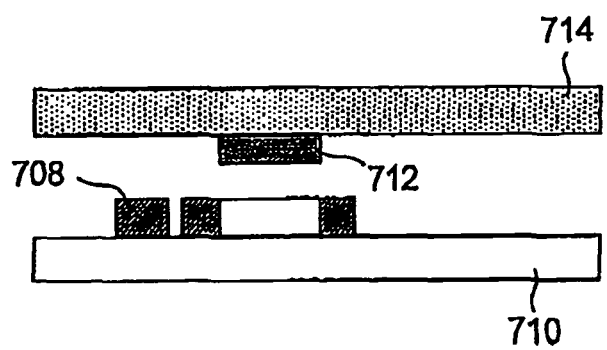

FIGS. 7A-7E shows isometric and cross-sectional views of resonators 701-706 and a waveguide 708 disposed on a substrate 710 and a heating element 712 positioned in in accordance with embodiments of the present invention. The resonators 701-706 represent the resonators 606-611 or the resonators 626-631 and the waveguide 708 represents a portion of the waveguide 646. FIG. 7A shows an isometric view of the heating element 712 disposed on the substrate 710 adjacent to resonators 701-706. FIG. 7B shows an isometric view of the heating element 712 embedded in the substrate 710 adjacent to the resonators 701-706. FIGS. 7C-7D show an isometric and a cross-sectional view along a line 7D-7D, shown in FIG. 7C, of the heating element 712 embedded in a second substrate 714 and positioned beneath the resonators 701-706. FIG. 7E shows a cross-sectional view of the heating element 712 suspended above resonators 701-706.

The temperature detectors 613, 614, 633, and 634 can be semiconductor diode-based or transistor-based thermometers disposed on the surface of the substrate adjacent to the resonators or embedded within the substrate of the transmitter 602 and receiver 604. Diode and transistor-based thermometry is typically carried out by forward biasing a diode or transistor junction with a substantially constant current and measuring the resulting forward voltage drop. The change in voltage is associated with the temperature. The temperature control 624 detects the voltage drop across the detectors 613 and 614 and is configured to determine the temperature of the substrate surrounding the resonators 606-611. Likewise, the temperature control 644 detects the voltage drop across the detectors 633 and 634 and is configured to determine the temperature of the substrate surrounding the resonators 626-631. Embodiments of the present invention are not limited to two temperature detectors disposed in the positions represented in FIG. 6. Any suitable number of temperature detectors can be used and positioned in various locations around the array of resonators.

As shown in FIG. 6, the transmitter resonators 606-611 and the receiver resonators 626-631 are disposed adjacent to the waveguide 646, which is optically coupled at one end to a laser source 642. The source 648 can be a mode-locked or a comb laser, or the laser source 648 comprises a number of different lasers and an optical multiplexer, each laser emitting a different wavelength of light. The wavelengths are injected simultaneously into the waveguide 646. FIG. 6 also reveals that the path length L of each resonator in the arrays of resonators 606-611 and 626-631 is different and selected so that each resonator has a different resonance with a wavelength of light traveling in the waveguide 646 at a given temperature. The path lengths of the resonators can be selected so that the difference in resonance wavelength associated with adjacent resonators approximately matches the difference in the regularly spaced wavelengths of light output from the source 648.

In certain embodiments, the resonance wavelengths of adjacent resonators in an array of resonators are spaced approximately by the same wavelength:

$$\Delta\lambda \approx \lambda_{j+1} - \lambda_j$$

where $\lambda_{j+1}$ and $\lambda_j$ are the resonance wavelengths of adjacent resonators with $\lambda_{j+1} > \lambda_j$ and the corresponding path lengths satisfying the condition that $L_{j+1} > L_j$. The wavelength spacing $\Delta\lambda$, also represents the spacing between wavelengths of light output from the source 648. For example, the spacing $\Delta\lambda$ between wavelengths output from the source 648 can be 3.75 nm, and the path lengths of adjacent transmitter and receiver resonators can be dimensioned so that the resonance wavelength spacing between adjacent resonators is also approximately 3.75 nm. The resonance wavelength spacing also has a corresponding temperature spacing, $\Delta T$, which is the temperature that a first resonator with a smaller path length than an adjacent second resonator would have to be heated to in order for the first resonator to have approximately the same resonance wavelength as the second resonator.

With regard to the exemplary embodiment shown in FIG. 6, the path length L of each resonator in the transmitter and receiver arrays is selected so that four of the six resonators each have resonance with one of four regularly spaced wavelengths of light emitted from the source 648 at a given temperature. Two of the six transmitter and receiver resonators that do not have resonance with the four wavelengths of light at the given temperature are called "redundant resonators."

The temperature of resonators integrated with CMOS-nanophotonic systems fluctuates over time due to changes in the power consumption and temperature of neighboring circuitry. Embodiments of the present invention are directed to obtaining a resonance temperature for the array of resonators. A resonance temperature T is a temperature at which each resonator of a particular subset of the array of resonators has resonance with one of the wavelengths of light carried by the waveguide 646. Each subset of the array of resonators has a tunable temperature range in which heat can be applied to maintain the resonance temperature T. The tunable temperature range, represented by $(T-\Delta T, T)$ has an upper limit at which no joule heating is needed to maintain the resonance temperature T and a lower limit where a maximum amount of joule heating is needed to maintain T. However, when the temperature increases beyond T in the absence of joule heating due to high ambient temperature or power dissipation of other circuits, the resonance temperature T can no longer be maintained and the resonators have to be heated by an amount $\Delta H$ so that a different subset of the array of resonators is brought into resonance with the wavelengths traveling in the waveguide.

Figure 8:
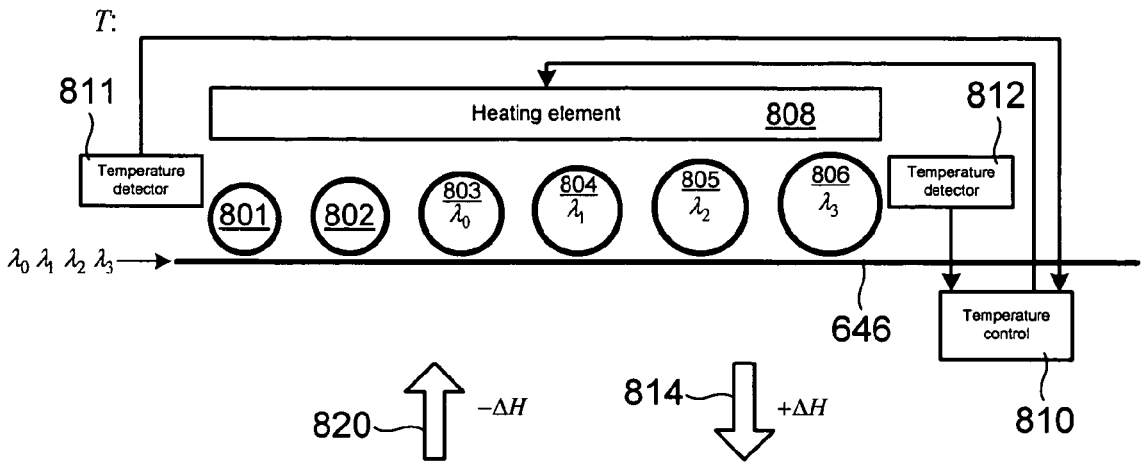
FIG. 8 shows an example of thermally tuning an array of resonators in accordance with embodiments of the present invention.
Figure 8:
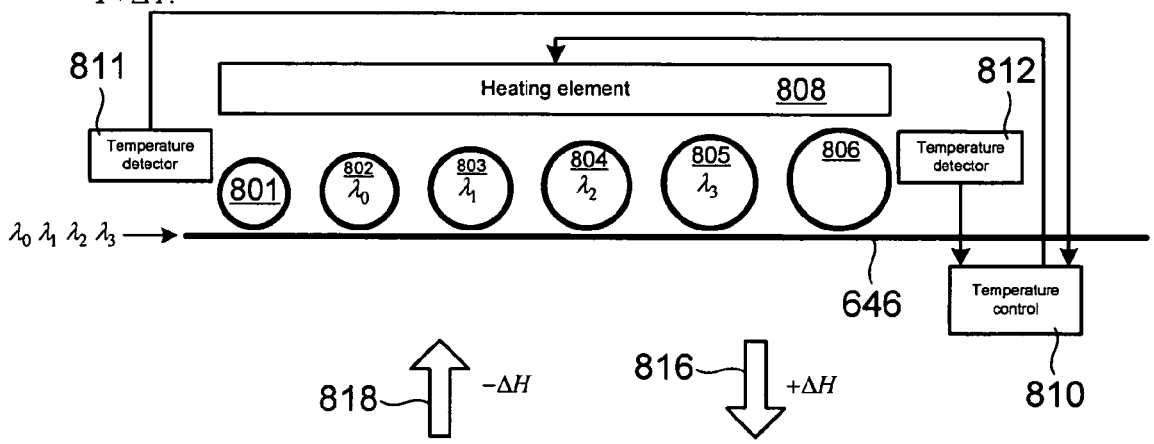
Figure 8:
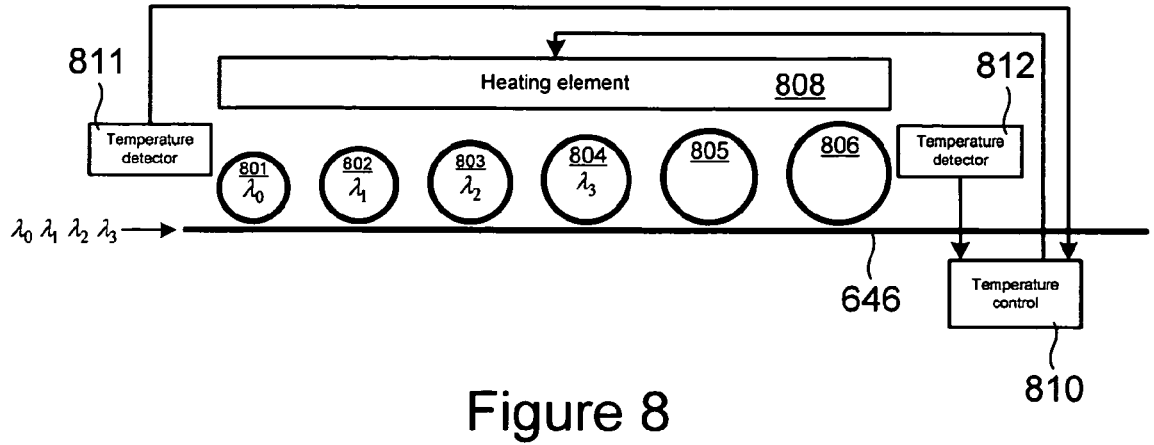

FIG. 8 shows an example of thermally tuning an array of resonators 801-806 disposed adjacent to the waveguide 646 in accordance with embodiments of the present invention. The array of resonators 801-806, heating element 808, temperature control 810, temperature detectors 811 and 812 can represent the array of transmitter resonators 606-611, heating element 612, temperature control 624, detectors 613 and 614 or represent the array of receiver resonators 626-631, heating element 632, temperature control 644, and detectors 633 and 634. The source 648 (not shown) injects four separate evenly spaced wavelengths of light $\lambda_0$, $\lambda_1$, $\lambda_2$, and $\lambda_3$ into the waveguide 646. In FIG. 8, labels $\lambda_0$, $\lambda_1$, $\lambda_2$, and $\lambda_3$ identify subsets of the resonators 801-806 having resonance with the wavelengths $\lambda_0$, $\lambda_1$, $\lambda_2$, and $\lambda_3$ at three different temperatures. Based on temperature measurements obtained by temperature detectors 811 and 812, the temperature control 812 supplies the appropriate amount of current to the heating element 810 which, in turn, heats the resonators 801-806 so that a subset of four resonators maintains resonance with the wavelengths $\lambda_0$, $\lambda_1$, $\lambda_2$, and $\lambda_3$. However, when the resonators reach certain temperatures separated by a temperature change $\Delta T$, the resonance temperature can no longer be maintained and the resonators have to be appropriately heated by an amount $\Delta H$ so that a different subset of the array of resonators is brought into resonance with the wavelengths $\lambda_0$, $\lambda_1$, $\lambda_2$, and $\lambda_3$ at a different resonance temperature. For example, assume that initially, at a resonance temperature T, the subset of resonators 803-806 have resonance with the wavelengths $\lambda_0$, $\lambda_1$, $\lambda_2$, and $\lambda_3$. The resonators 801 and 802 are considered redundant resonators. The temperature control 810 monitors the temperature of the resonators 801-806 via the temperature detectors 812 and adjusts the level of heat output from the heating element 808 to maintain the resonance temperature at approximately T. However, when the temperature increases beyond T in the absence of resonators heating due to high ambient temperature or power dissipation of other circuits, the resonance wavelengths of the resonators 803-806 can no longer be maintained at temperature T by heating. In this case, the temperature control 812 heats the resonators 801-806 by an amount ΔH to obtain a resonator temperature of T+ΔT, as indicated by directional arrow 814, changing the refractive index and the path lengths of the resonators 801-806 so that a different subset of resonators 802-805 has resonance with the wavelengths $\lambda_0$, $\lambda_1$, $\lambda_2$, and $\lambda_3$. The resonators 801 and 806 become redundant resonators. The temperature control 810 continues to monitor the temperature of the resonators 801-806 and adjust the level of heat output from the heating element 808 to maintain the resonance temperature at approximately T+ΔT. When the temperature increases beyond T+ΔT in the absence of resonator heating due to high ambient temperatures or power dissipation of other circuits, the temperature control 812 again heats the resonators 801-806 by the amount ΔH needed to obtain resonance temperatures of T+2ΔT, as indicated by directional arrow 816, placing a different subset of resonators 801-804 in resonance with the wavelengths $\lambda_0$, $\lambda_1$, $\lambda_2$, and $\lambda_3$. The resonators 805 and 806 become redundant resonators. Directional arrow 818 represents allowing the resonators 801-806 to cool when the resonator heating power exceeds ΔH by decreasing the temperature of the rings from T+2ΔT to T+ΔT and shifting the resonance wavelengths so that the subset of resonators 802-805 have resonance with the wavelengths $\lambda_0$, $\lambda_1$, $\lambda_2$, and $\lambda_3$. Directional arrow 820 represents allowing the resonators 801-806 to further cool by temperature ΔT when the resonator heating power exceeds ΔH by shifting the resonance wavelengths so that the subset of resonators 803-806 are in resonance with the wavelengths $\lambda_0$, $\lambda_1$, $\lambda_2$, and $\lambda_3$.

Note that while the resonance temperature is being shifted from one resonance temperature to another, communication is paused until the new temperature is reached, electronic tuning is used to null out the changing temperature, or a combination of communication pause and electronic tuning are employed.

Figure 9:
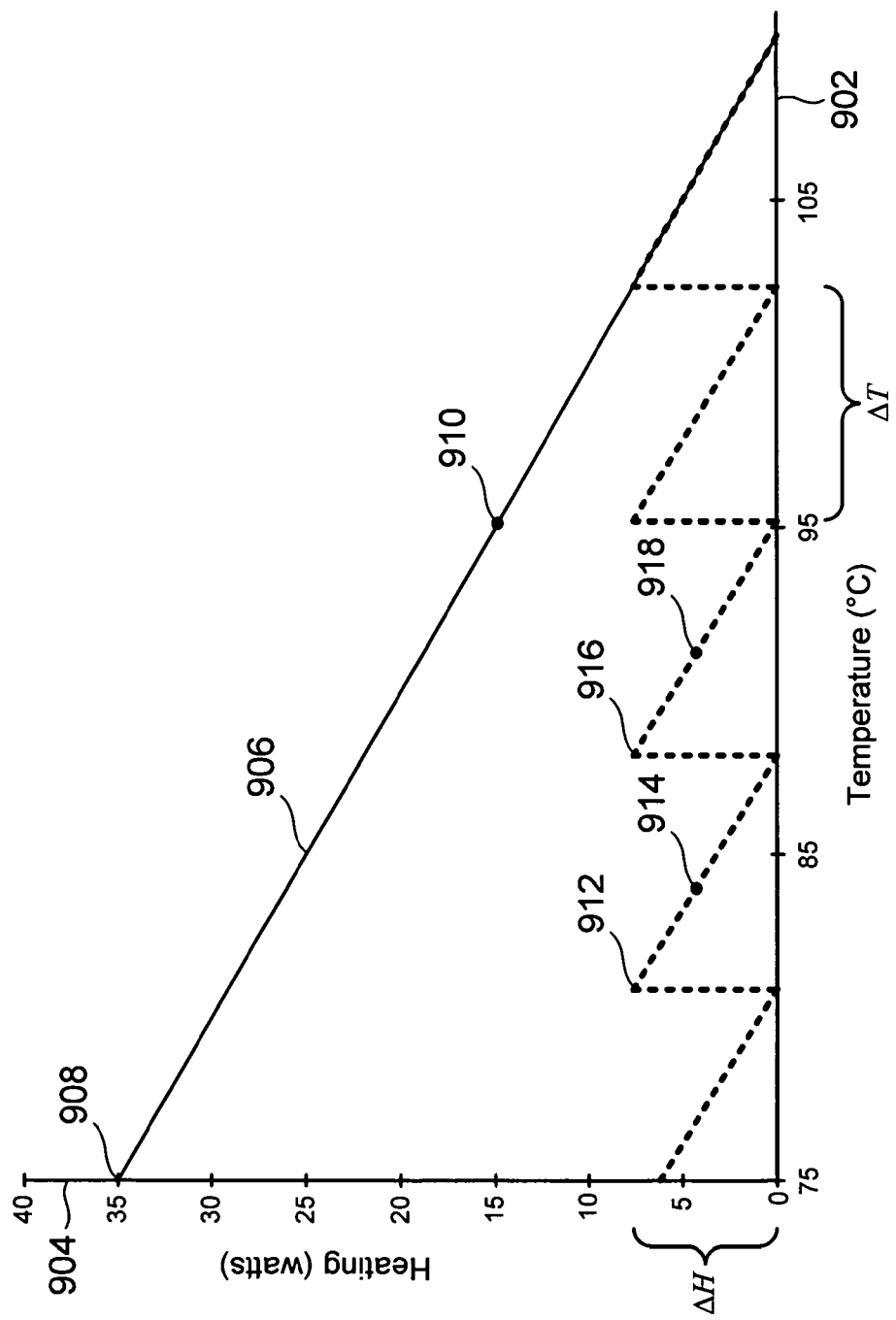
FIG. 9 shows power savings obtained for a first array of resonators thermally tuned in accordance with embodiments of the present invention.

Employing arrays with redundant resonators as described above with reference to FIG. 8 can lead to a considerable power savings over time when compared with arrays of resonators comprising a minimal set or no redundant resonators. FIG. 9 shows power savings obtained using redundant resonators with resonance wavelengths separated by Δλ in accordance with embodiments of the present invention. Horizontal axis 902 represents the temperature, and vertical axis 904 represents heat. Solid line 906 represents the amount of heat needed to maintain the resonance wavelength of a first minimal array of resonators subjected to temperatures ranging between 75° C. and 105.7° C. For example, the first minimal array of resonators can be composed of four resonators, each resonator configured to have resonance with one of the four wavelengths $\lambda_0$, $\lambda_1$, $\lambda_2$, and $\lambda_3$ described above. In other words, the first array of resonators contains no redundant resonators. Point 908 on line 906 reveals that when the temperature of the first array of resonators is 75° C., the amount of heat needed to maintain resonance is about 35 watts, and point 910 on the same line 906 reveals that when the temperature of the minimal set of resonators is about 95° C., the amount of heat needed to maintain resonance is about 15 watts. On the other hand, dashed-line curve 912 represents the amount of heat needed to maintain resonance wavelengths for subsets of resonators of an array of at least eight resonators with four of the eight resonators being redundant. Vertical portions of curve 912 correspond to the amount of heat ΔH needed to shift the resonance wavelengths from a first subset of resonators to a second subset of resonators, as described above with reference to FIG. 8. For example, point 914 indicates that when the temperature of the array of resonators is about 85° C., about 3 watts of heat is needed to maintain resonance of a first subset of resonators. Point 916 indicates that when the temperature of the array is about 88° C., the temperature control supplies about 7 watts of heat corresponding to ΔH to the array of resonators enabling a second subset of the resonators to come into resonance with the wavelengths. Finally, point 918 indicates that when the temperature of the array of resonators is about 92° C., again only about 3 watts of heat is needed to maintain resonance of the second subset of resonators.

Figure 10A:
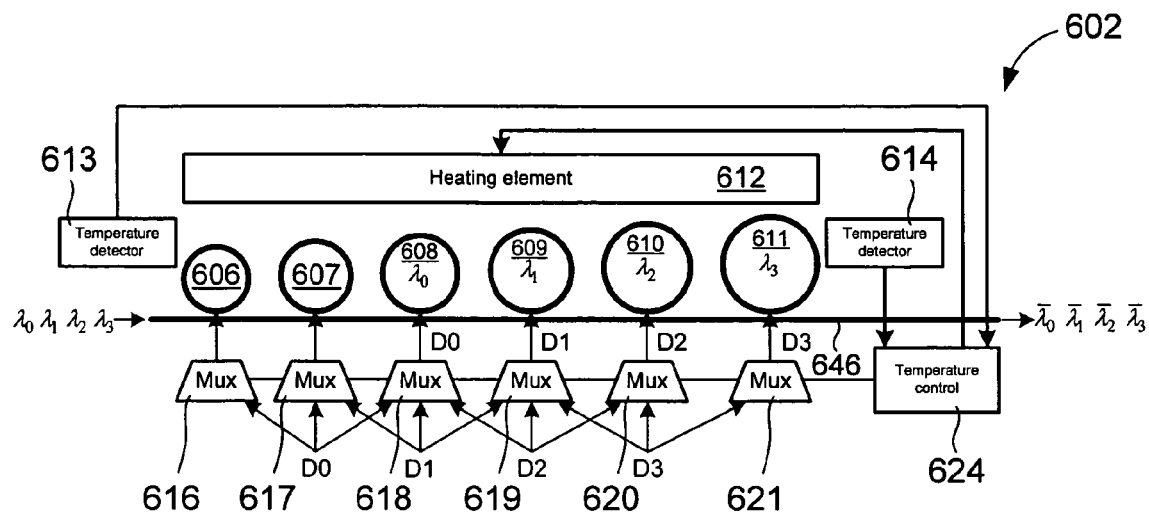
FIGS. 10A-10C show operation of a transmitter configured in accordance with embodiments of the present invention.
Figure 10B:
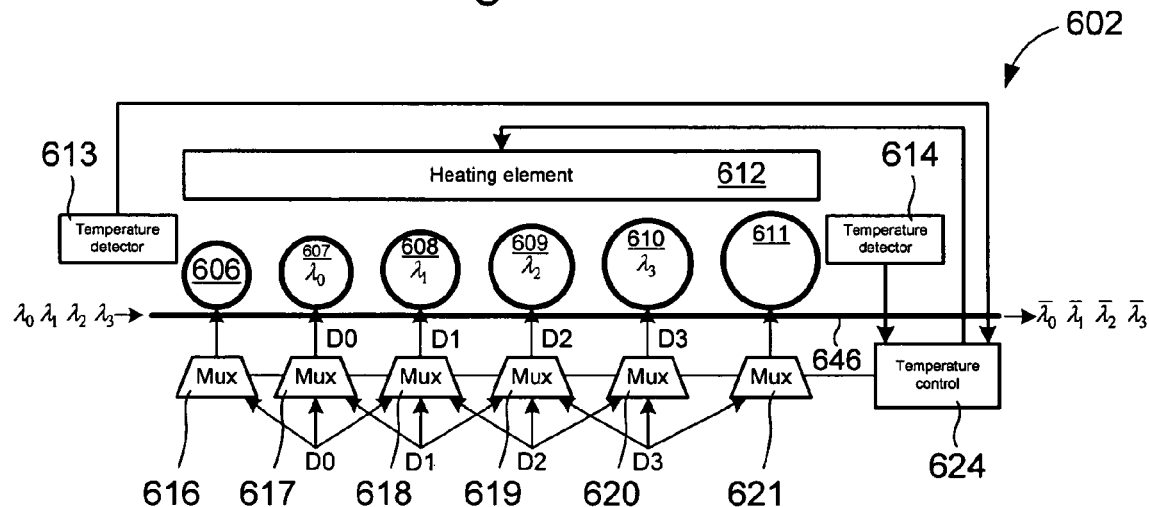
Figure 10C:
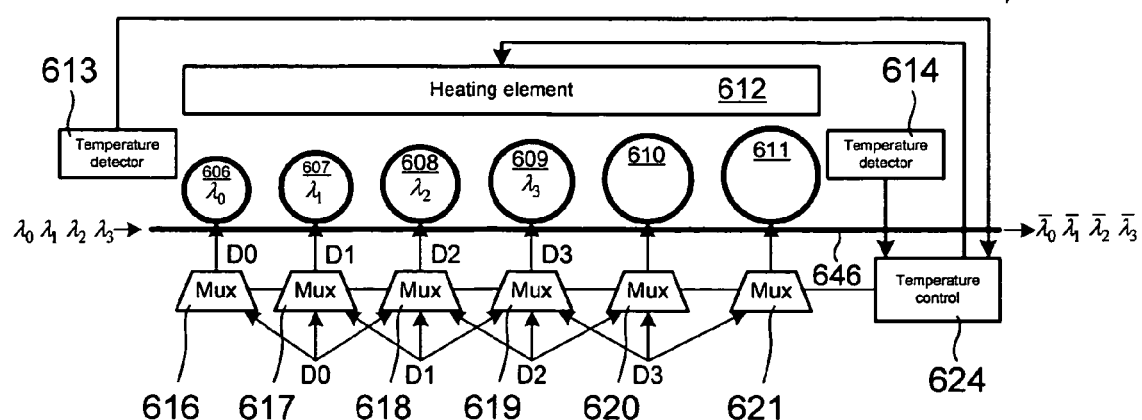

FIGS. 10A-10C show operation of the transmitter 602 to encode from four electrical signals into four optical signals as the temperature of the transmitter 602 varies, in accordance with embodiments of the present invention. The multiplexers 616-621 are in electronic communication with a first electronic device (not shown). The first electronic device can be a processor, memory, a circuit board, a server, a storage server, a core of a multicore processor, an external network connection or any other data electronic processing, storing, or transmitting device that generates or transmits data encoded in electrical signals. The first electronic device generates four separate electrical signals denoted by D0, D1, D2, and D3, where D0 is sent to multiplexers 616-618, D1 is sent to multiplexers 617-619, D2 is sent to multiplexers 618-620, and D3 is sent to multiplexers 619-621. The electrical signals D0, D1, D2, and D3 can each encode a different data stream generated or transmitted by the first electronic device as a pattern of "on" and "off" or "high" and "low" voltages or currents that represent binary information. For example, a "low" voltage can represent the binary number "1" and a "high" voltage can represent the binary number "0." The laser source (not shown) simultaneously injects four separate unmodulated wavelengths of light $\lambda_0$, $\lambda_1$, $\lambda_2$, and $\lambda_3$ into the bus waveguide 646.

In FIG. 10A, at a resonance temperature T, the resonators 608-611 have resonance with the wavelengths $\lambda_0$, $\lambda_1$, $\lambda_2$, and $\lambda_3$, respectively, while the resonators 606 and 607 are idle. The temperature control 624 monitors the temperature of the resonators 606-611 via temperature detectors 613 and 614 and heats the resonators 606-611 accordingly to maintain the temperature T, as described above with reference to FIGS. 8 and 9. The resonators 606-611 are electronically tunable and can be configured as p-i-n junctions, as described above with reference to FIGS. 4 and 5. While the temperature control 624 maintains the resonance temperature T, it also sends a corresponding electrical control signal $S_T$ to the multiplexers 616-621. As shown in FIG. 10A, the multiplexers 618-621 respond to the signal $S_T$ by sending the electrical signals D0, D1, D2, and D3 to the resonators 608-611, respectively. The patterns of "high" and "low" voltages or currents associated with the separate signals D0, D1, D2, and D3 are applied separately to corresponding resonators 608-611 causing the effective refractive index $n_{eff}$ of each resonator to shift according to the pattern, which modulates the amplitude of the corresponding wavelengths. In other words, the resonators 608-611 are electronically tuned in and out of the resonance with the wavelengths $\lambda_0$, $\lambda_1$, $\lambda_2$, and $\lambda_3$. For example, the resonator 608 receives the "high" and "low" pattern of voltages associated with the signal D0 from the multiplexer 618. When a "low" voltage arrives at the resonator 608, the effective refractive index $n_{eff}$ of the resonator 608 is unchanged and light is evanescently coupled into the resonator 608 for the duration of the low voltage portion of the signal D0. As a result, the amplitude of the wavelength $\lambda_0$ decreases. The light trapped in the resonator 608 ultimately decays and leaks out via losses associated with the resonator. On the other hand, when a "high" voltage arrives at the resonator 608, the effective refractive index $n_{eff}$ of the resonator 608 is changed and light is not evanescently coupled into the resonator 608 for the duration of the high voltage portion of the signal D0. As a result, the wavelength $\lambda_0$ passes the resonator undisturbed. The resulting modulated light is an optical signal, $\overline{\lambda}_0$, comprising a pattern of "low" and "high" intensities traveling along the waveguide 646, where a "low" intensity portion of the optical signal can represent the binary number "1" and a "high" intensity portion of the optical signal can represent the binary number "0." In other words, the "low" and "high" intensity pattern of the optical signal corresponds to the "low" and "high" voltage or current pattern of the signal D0. The other resonators 609-611 are also independently operated in the same manner to encode the electrical signals D1, D2, and D3 into the wavelengths $\lambda_1$, $\lambda_2$, and $\lambda_3$, respectively, producing optical signals $\lambda_1$, $\lambda_2$, and $\lambda_3$. The optical signals $\overline{\lambda}_0$, $\overline{\lambda}_2$, and $\overline{\lambda}_3$ are all travel simultaneously in the waveguide 646.

In FIG. 10B, when the temperature of the resonators 606-611 increases beyond T in the absence of resonator heating due to high ambient temperature or power dissipation of the circuits, the temperature control 624 accordingly heats the resonators 606-611 by $\Delta H$ to obtain a resonance temperature of T+$\Delta T$, as described above with reference to FIGS. 8 and 9. As a result, the resonance wavelengths of the resonators 606-611 shifts so that resonators 607-610 have resonance with the wavelengths $\lambda_0$, $\lambda_1$, $\lambda_2$, and $\lambda_3$, respectively, while the resonators 606 and 610 are idle. The temperature control 624 monitors the temperature of the resonators 606-611 via temperature detectors 613 and 614 and adjusts the temperature of the resonators 606-611. While the temperature control 624 maintains the resonance temperature T+$\Delta T$, it also sends an electrical control signal $S_{T+\Delta T}$ to the multiplexers 616-621. As shown in FIG. 10B, the multiplexers 617-620 respond to the signal $S_{T+\Delta T}$ by sending the electrical signals D0, D1, D2, and D3 to the resonators 607-610, respectively. The resonators 607-610 modulate the wavelengths $\lambda_0$, $\lambda_1$, $\lambda_2$, and $\lambda_3$ in order to generate optical signals $\overline{\lambda}_0$, $\overline{\lambda}_2$, and $\overline{\lambda}_3$, as described above with reference to FIG. 10A.

In FIG. 10C, when the temperature of the resonators 606-611 increases beyond T+$\Delta T$ in the absence of resonator heating due to high ambient temperature or power dissipation of the circuits, the temperature control 624 accordingly heats the resonators 606-611 by $\Delta H$ to obtain a resonance temperature of T+2$\Delta T$, as described above with reference to FIGS. 8 and 9. As a result, the resonance wavelengths of the resonators shifts so that resonators 606-609 have resonance with the wavelengths $\lambda_0$, $\lambda_1$, $\lambda_2$, and $\lambda_3$, respectively, while the resonators 610 and 611 are idle. The temperature control 624 monitors the temperature of the resonators 606-611 via temperature detectors 613 and 614. While the temperature control 624 maintains the resonance temperature T+2$\Delta T$, it also sends an electrical control signal $S_{T+2\Delta T}$ to the multiplexers 616-621. As shown in FIG. 10C, the multiplexers 616-619 respond to the signal $S_{T+2\Delta T}$ by sending the electrical signals D0, D1, D2, and D3 to the resonators 606-609, respectively. The resonators 606-609 modulate the wavelengths $\lambda_0$, $\lambda_1$, $\lambda_2$, and $\lambda_3$ in order to generate optical signals $\overline{\lambda}_0$, $\overline{\lambda}_1$, $\overline{\lambda}_2$, and $\overline{\lambda}_3$, as described above with reference to FIG. 10A.

Note that while the resonance temperature of the resonators 606-611 is being shifted from one temperature to another, modulation is paused until the new temperature is reached, electronic tuning is used to null out the changing temperature, or a combination of communication pause and electronic tuning are employed.

Figure 11A:
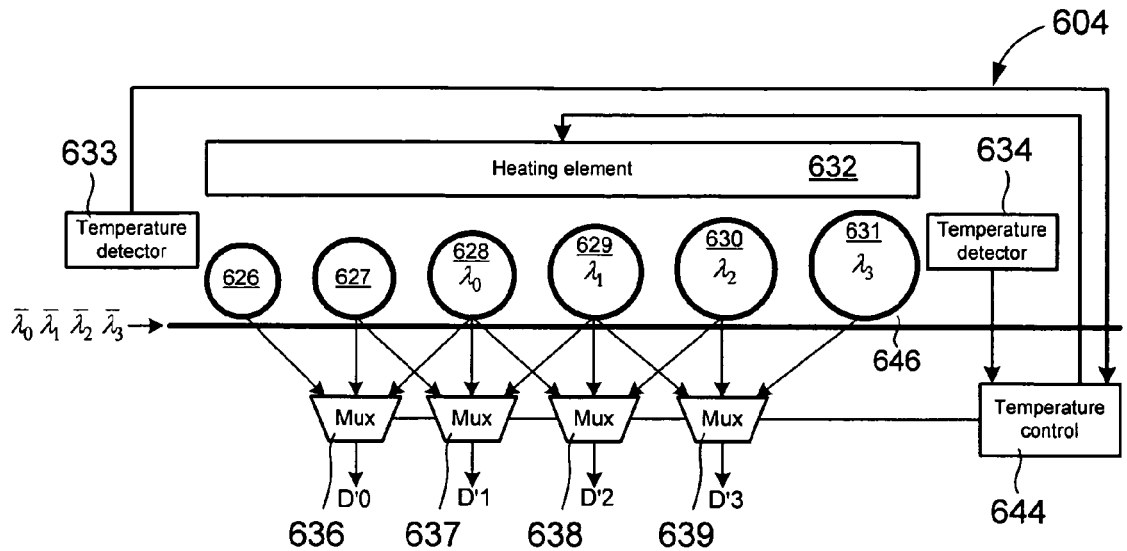
FIGS. 11A-11C show operation of a receiver configured in accordance with embodiments of the present invention.
Figure 11B:
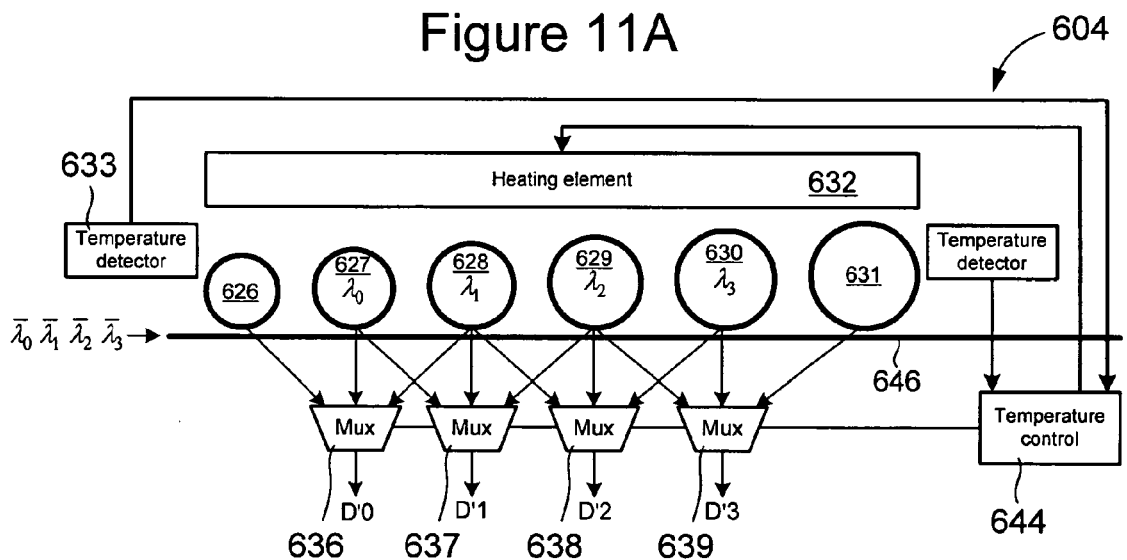
Figure 11C:
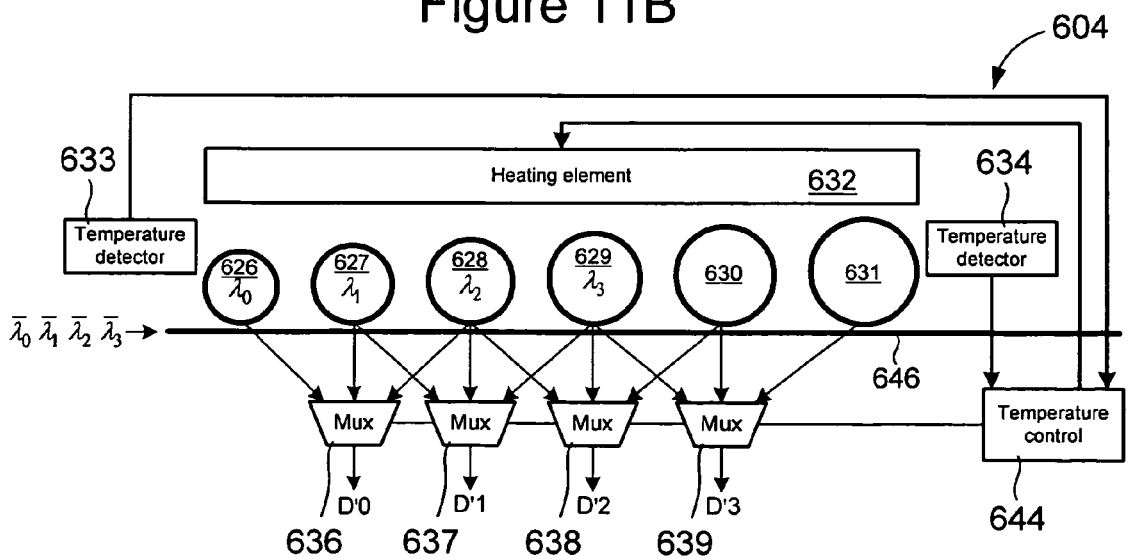

FIGS. 11A-11C show operation of the receiver 604 to convert four optical signals $\overline{\lambda}_0$, $\overline{\lambda}_1$, $\overline{\lambda}_2$, and $\overline{\lambda}_3$ into four electrical signals D'0, D'1, D'2, and D'3 as the temperature of the receiver 604 varies, in accordance with embodiments of the present invention. The multiplexers 636-639 are in electronic communication with a second electronic device (not shown) that can be different from the first electronic device. The optical signals $\overline{\lambda}_0$, $\overline{\lambda}_1$, $\overline{\lambda}_2$, and $\overline{\lambda}_3$ traveling in the waveguide 646 can be generated by a transmitter located on the waveguide 646, such as transmitter 602, or generated by different device. Each of the resonators 626-631 can be configured with a detector region. For example, the detector region can be a doped region of the resonator composed of SiGe. The detector region converts the optical signal circulating in a resonator into an electrical signal that can be transmitted over signal lines to the electronically coupled multiplexers. In particular, the resonator 626 generates electrical signals that are sent to the multiplexer 636; the resonator 627 generates electrical signals that are sent to multiplexers 636 and 637; the resonator 628 generates electrical signals that are sent to multiplexers 636, 637, and 638; the resonator 629 generates electrical signals that are sent to multiplexers 637, 638, and 639; the resonator 630 generates electrical signals that are sent to multiplexers 638 and 639; and the resonator 631 generates electrical signals that are sent to the multiplexer 639. Each multiplexer only sends one of the electrical signals it receives to the second electronic device based on an electronic control signal provided by the temperature control 644.

In FIG. 11A, at resonance temperature T, the resonators 628-631 have resonance with the wavelengths $\lambda_0$, $\lambda_1$, $\lambda_2$, and $\lambda_3$, respectively, while the resonators 626 and 627 are idle. The temperature control 644 monitors the temperature of the resonators 626-631 via temperature detectors 633 and 634 and adjusts the temperature of the resonators 626-631 accordingly to maintain the resonance temperature T, as described above with reference to FIGS. 8 and 9. The resonators 628-631 separately extract and convert the optical signals $\overline{\lambda}_0$, $\overline{\lambda}_1$, $\overline{\lambda}_2$, and $\overline{\lambda}_3$ into four electrical signals D'0, D'1, D'2, and D'3, respectively. For example, the resonator 628 converts the "low" and "high" intensity pattern of the optical signal $\overline{\lambda}_0$ circulating in the resonator 628 into a corresponding "off" and "on" electrical signal that it simultaneously sends to the multiplexers 636, 637, and 638. While the temperature control 644 maintains the temperature of the resonators at T, it sends a corresponding electrical control signal $P_T$ to the multiplexers 636-639. In response to the signal $P_T$, the multiplexers 636-639 send electrical signals D'0, D'1, D'2, and D'3 to the second electronic device. For example, although multiplexer 638 simultaneously receives electrical signals D'0, D'1, and D'2 from the resonators 628-630, in response to the signal $P_T$, the multiplexer 638 sends only the electrical signal D'2.

In FIG. 11B, when the temperature of the resonators 626-631 increases beyond T in the absence of resonator heating due to high ambient temperature or power dissipation of the circuits, the temperature control 644 accordingly heats the resonators 626-631 by $\Delta H$ to obtain a resonance temperature of T+$\Delta T$, as described above with reference to FIGS. 8 and 9. As a result, the resonance wavelengths of the resonators 626-631 shifts so that resonators 627-630 have resonance with the wavelengths $\lambda_0$, $\lambda_1$, $\lambda_2$, and $\lambda_3$, respectively, while the resonators 626 and 631 are idle. The resonators 627-630 separately extract and convert the optical signals $\overline{\lambda}_0$, $\overline{\lambda}_2$, and $\overline{\lambda}_3$ into electrical signals D'0, D'1, D'2, and D'3, respectively. The temperature control 644 monitors the temperature of the resonators 626-631 via temperature detectors 633 and 634. While the temperature control 644 maintains the temperature T+ΔT, it also sends an electrical control signal $P_{T+\Delta T}$ to the multiplexers 636-639. As shown in FIG. 11B, the multiplexers 636-639 respond to the signal $P_{T+\Delta T}$ by sending the electrical signals D'0, D'1, D'2, and D'3 to the second electronic device.

In FIG. 11C, when the temperature of the resonators 626-631 increases beyond T+ΔT in the absence of resonator heating due to high ambient temperature or power dissipation of the circuits, the temperature control 644 accordingly heats the resonators 626-631 by ΔH to obtain a resonance temperature of T+2ΔT, as described above with reference to FIGS. 8 and 9. As a result, the resonance wavelengths of the resonators 626-631 shifts so that resonators 626-629 have resonance with the wavelengths $\lambda_0$, $\lambda_1$, $\lambda_2$, and $\lambda_3$, respectively, while the resonators 630 and 631 are idle. The resonators 626-629 separately extract and convert the optical signals $\overline{\lambda}_0$, $\overline{\lambda}_1$, $\overline{\lambda}_2$, and $\overline{\lambda}_3$ into electrical signals D'0, D'1, D'2, and D'3, respectively. The temperature control 644 continues to monitor the temperature of the resonators 626-631 via temperature detectors 633 and 634. While the temperature control 644 maintains the temperature T+2ΔT, it also sends an electrical control signal $P_{T+2\Delta T}$ to the multiplexers 636-639. As shown in FIG. 11C, the multiplexers 636-639 respond to the signal $P_{T+2\Delta T}$ by sending the electrical signals D'0, D'1, D'2, and D'3 to the second electronic device.

Note that while the resonance temperature of the resonators 626-631 is being shifted from one temperature to another, detection is paused until a new resonance temperature is reached, electronic tuning is used to null out the changing temperature, or a combination of communication pause and electronic tuning are employed.

Embodiments of the present invention are not limited to transmitters and receivers comprising arrays of just six resonators where four of the resonators are used to encode information in optical signals or detect optical signals at a particular temperature. In other embodiments, arrays of resonators can be comprised of any suitable number of resonators provided the number of resonators in the array of resonators exceeds the number of wavelengths of light. In addition, embodiments of the present invention are not limited to an array of resonator with resonance wavelengths spaced by Δλ. In other embodiments, the resonance wavelengths of the resonators can be spaced by Δλ/m, where m is a positive integer, while the wavelengths of unmodulated light and optical signals are separated by Δλ. For example, this can be thought of as including an additional resonator between each of the resonators described above with reference to FIG. 8, which requires doubling the number of resonators. In systems with coarse wavelength division multiplexing where there are a small number of resonators with wide resonance wavelength spacing the power savings can be advantageous.

Figure 12:
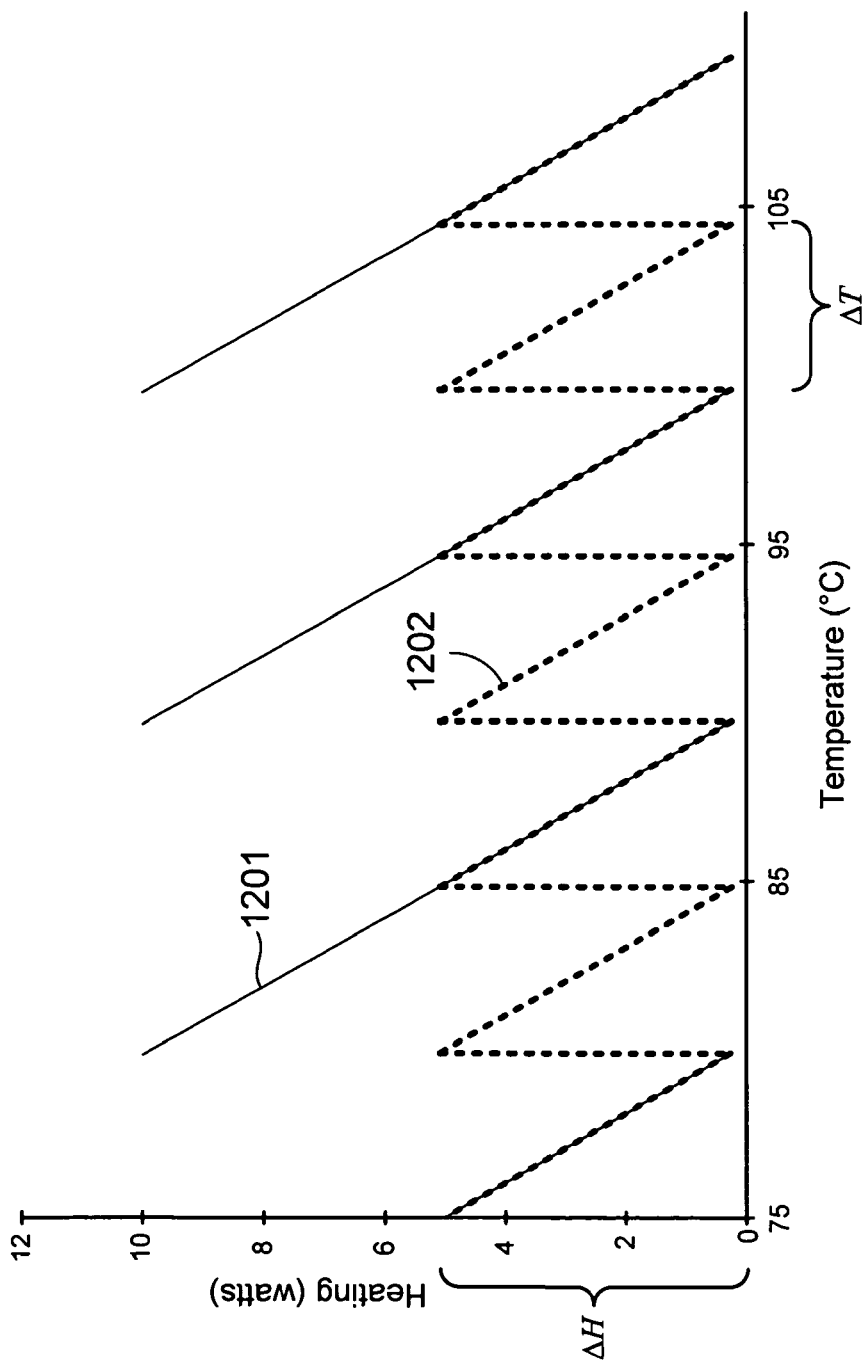
FIG. 12 shows power savings obtained for a second array of resonators thermally tuned in accordance with embodiments of the present invention.

FIG. 12 shows power savings obtained using redundant resonators with resonance wavelengths separated by Δλ/2 in accordance with embodiments of the present invention. Solid line 1201 represents the amount of heat needed to maintain the resonance wavelength for a system with redundant resonators spaced at Δλ, and dashed-line curve 1202 represents the amount of heat needed to maintain resonance wavelengths for subsets of a larger array of resonators with resonance wavelengths separated by Δλ/2. Comparing curve 1202 with curve 912 reveals that the amount of heating consumed in temperature tuning is less for the larger array of resonators shown in FIG. 12 than for the second array of resonators represented in FIG. 9. However, the temperature change ΔT is about 4° C. for the resonators represented in FIG. 12, while the temperature change ΔT is about 8° C. for the resonators represented in FIG. 9.

Figure 13:
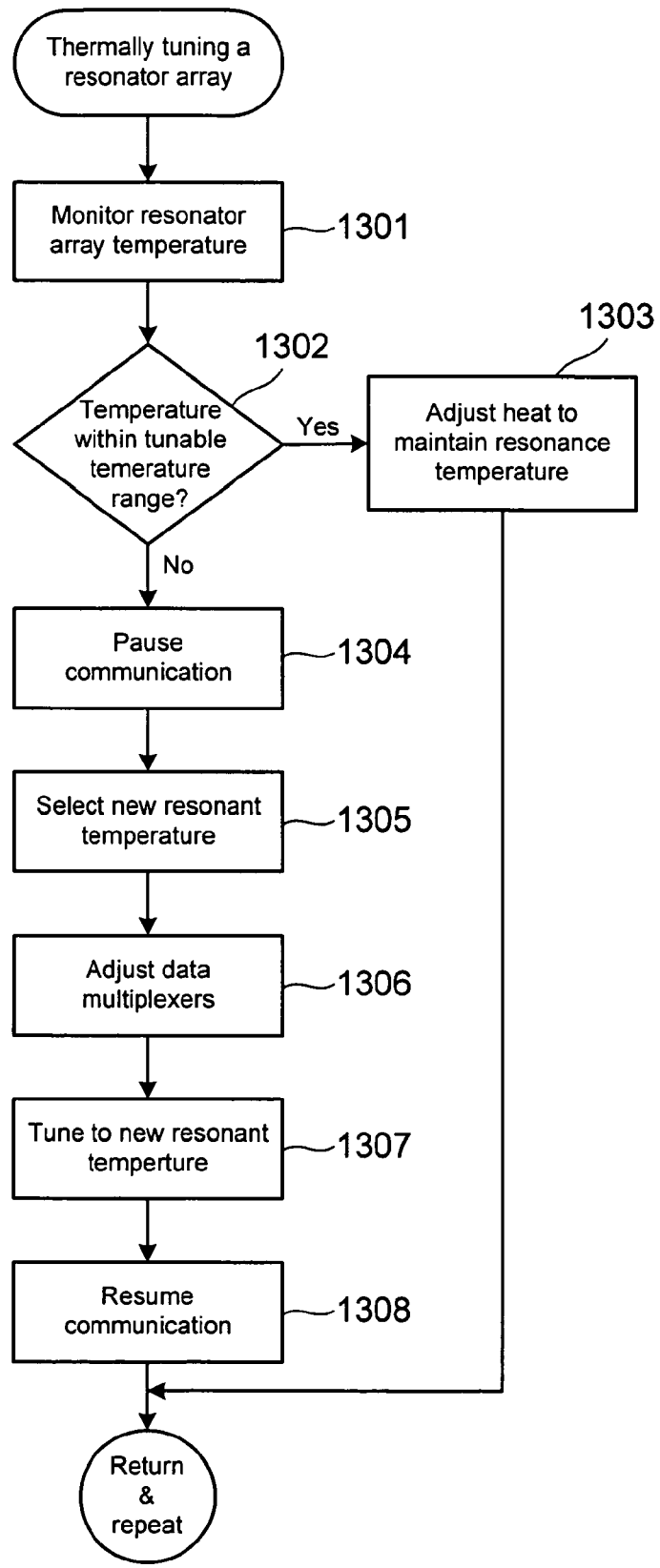
FIG. 13 shows a control-flow diagram of a method for thermally tuning an array of resonators in accordance with embodiments of the present invention.

FIG. 13 shows a control-flow diagram of a method for thermally tuning an array of resonators in accordance with embodiments of the present invention. Steps 1301-1308 can be performed to tune both modulator and detector arrays, as described above with reference to FIGS. 10-11. In step 1301, the temperature of an array of resonators is monitored, as described above with reference to FIG. 8. In step 1302, when the temperature of the array of resonators is within a tunable temperature range, proceed to step 1303, otherwise, proceed to step 1304. In step 1303, adjust heat applied to resonators to maintain resonance for a subset of resonators, as described above with reference to FIGS. 8 and 9. In step 1304, pause communication. In step 1305, a new resonant temperature is selected, as described above with reference to FIGS. 8-11. In step 1306, adjust multiplexers of modulator arrays accordingly so that data is encoded in optical signals using a different set of resonators, as described above with reference to FIG. 10, or adjust multiplexers of detector arrays accordingly so that optical signals are detected using a different set of resonators, as described above with reference to FIG. 11. In step 1307, thermally tune the resonators to a new resonant temperature, as described above with reference to FIGS. 8, 10, and 11. In step 1308, resume communication. In step 1309, steps 1301-1308 can be repeated for a subsequent round of transmission or detection.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A system comprising:
    an array of resonators (801-806) disposed adjacent to a waveguide (646), each resonator having a different resonance wavelength, and the array of resonators including at least one redundant resonator; and
    a heating element (808) disposed adjacent to the array of resonators and operated to control the temperature of the resonators so that each resonator in a subset of the array of resonators is in resonance with a different wavelength of light traveling in the waveguide.

2. The system of claim 1 further comprising:
    at least one temperature detector (811,812) disposed in proximity to the array of resonators; and
    a temperature control (810) in electronic communication with the heating element and the at least one temperature detector, wherein the temperature control monitors the temperature of the array of resonators via the at least one temperature detector and operates the heating element to control the temperature of the resonators.

3. The system of claim 2 wherein the temperature control operates the heating element to control the temperature of the array of resonators further comprises application of an amount of heat that shifts the resonance wavelength of the resonators so that a second subset of the array of resonators is in resonance with the wavelengths of light traveling in the waveguide when a resonance temperature cannot be maintained.

4. The system of claim 2 wherein the temperature control operates the heating element to control the temperature of the array of resonators further comprises application of an amount of heat to maintain the resonance wavelengths of the array of resonators when a resonance temperature can be maintained.

5. The system of claim 1 wherein each resonator in the array of resonators further comprises a p-i-n junction that can be electronically tuned to modulate the amplitude of a resonant wavelength of light traveling in the waveguide.

6. The system of claim 1 wherein each resonator in the array of resonators further comprises a detector region that converts an optical signal circulating in a resonator into an electrical signal.

7. The system of claim 1 wherein the array of resonators further comprises ring resonators (102) configured so that each resonator has a different path length.

8. The system of claim 1 wherein the array of resonators further comprise resonance wavelength spacing approximately matching the wavelength spacing of the wavelengths of light traveling in the waveguide or is a fraction of the wavelength spacing of the wavelengths of light traveling in the waveguide.

9. The system of claim 1 wherein heating element further comprises an electronically resistive layer configured to deliver about the same amount of heat to each of the resonators in the array of resonators.

10. The system of claim 1 wherein at least one temperature detector further comprises a semiconductor diode-based thermometer or a semiconductor transistor-based thermometer.

11. A transmitter (602) comprising a system configured in accordance with claim 1 to encode information generated by an electronic device in modulated wavelengths of light traveling a waveguide.

12. A receiver (604) comprising a system configured in accordance with claim 1 to convert optical signals traveling in a waveguide into electrical signals.

13. A method for thermally tuning an array of resonators comprising:
monitoring the temperature (1301) of the array of resonators, each resonator having a different resonance wavelength;
applying a first amount of heat (1303) to the array of resonators so that each resonator in a first subset of the array of resonators is in resonance with a wavelength of light travelling in a waveguide adjacent to the array of resonators, when a resonance temperature can be maintained within a first tunable temperature range; and
applying a second amount of heat (1307) that shifts the resonance wavelengths of the array of resonators so that each resonator in a second subset of the array of resonators is in resonance with the wavelengths of light traveling in the waveguide, when the resonance temperature can be maintained within a second tunable temperature range.

14. The method of claim 13 further comprising pausing communication (1304) with the array of resonators while applying the second amount of heat.

15. The method of claim 13 further comprises:
adjusting multiplexers to receive data using the second subset of the array of resonators (1306) when the array of resonators are employed in a detector array (604); or
adjusting multiplexers to transmit data using the second subset of the array of resonators (1306) when the array of resonators are employed in a transmitter array (602).

* * * * *

UNITED STATES PATENT AND TRADEMARK OFFICE
CERTIFICATE OF CORRECTION

PATENT NO. : 8,660,390 B2  Page 1 of 1
APPLICATION NO. : 13/146473
DATED : February 25, 2014
INVENTOR(S) : Moray McLaren et al.

It is certified that error appears in the above-identified patent and that said Letters Patent is hereby corrected as shown below:

In the Claims

In column 16, line 4, in Claim 11, before "a" insert -- in --.

Signed and Sealed this
Sixteenth Day of September, 2014

Michelle K. Lee
*Deputy Director of the United States Patent and Trademark Office*